United States Patent [19]
Melo et al.

[11] Patent Number: 5,867,728
[45] Date of Patent: Feb. 2, 1999

[54] PREVENTING CORRUPTION IN A MULTIPLE PROCESSOR COMPUTER SYSTEM DURING A PERIPHERAL DEVICE CONFIGURATION CYCLE

[75] Inventors: Maria L. Melo; James R. Reif, both of Houston, Tex.

[73] Assignee: Compaq Computer Corp., Houston, Tex.

[21] Appl. No.: 768,308

[22] Filed: Dec. 17, 1996

[51] Int. Cl.[6] ................................................. G06F 13/00
[52] U.S. Cl. ........................ 395/828; 395/284; 395/309
[58] Field of Search .................................. 395/283, 284, 395/828, 829, 830, 306, 308, 309

[56] References Cited

U.S. PATENT DOCUMENTS

| | | | |
|---|---|---|---|
| 5,379,384 | 1/1995 | Solomon | 395/308 |
| 5,428,748 | 6/1995 | Davidson et al. | 395/829 |
| 5,548,782 | 8/1996 | Michael et al. | 395/835 |
| 5,568,619 | 10/1996 | Blackledge et al. | 395/281 |
| 5,574,869 | 11/1996 | Young et al. | 395/306 |
| 5,737,524 | 4/1998 | Cohen et al. | 395/281 |

*Primary Examiner*—Glenn A. Auve
*Attorney, Agent, or Firm*—Paul N. Katz; Ronald L. Chichester

[57] ABSTRACT

To assure that memory and/or I/O cycles will run correctly after a PCI device configuration cycle that changes memory and/or I/O mapping, in a multi-processor P6 computer system that pipelines instructions. The memory and I/O cycles are suspended on the processor bus until the configuration cycle has been completed. A signal is generated within the address decode logic to prevent address decoding from taking place if a PCI device is being configured. During the configuration transactions, other pipelined transaction cycles are snoop stalled until the PCI configuration write has been completed.

22 Claims, 3 Drawing Sheets

PREVENTING CORRUPTION IN A MULTIPLE PROCESSOR COMPUTER SYSTEM DURING A PERIPHERAL DEVICE CONFIGURATION CYCLE

BACKGROUND OF THE INVENTION

1. Field of the Invention

The present invention relates to computer systems using a plurality of processors and a processor to peripheral bridge, and more particularly, in preventing memory and/or input-output corruption in the multiple processor computer system when a peripheral device is being configured.

2. Description of the Related Technology

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers.

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers has been the implementation of sophisticated peripheral devices such as video graphics adapters, local area network interfaces, SCSI bus adapters, full motion video and the like. These sophisticated peripheral devices are capable of data transfer rates approaching the native speed of the computer microprocessor central processing unit ("CPU"). The peripheral devices' data transfer speeds are achieved by connecting the peripheral devices to the microprocessor and associated random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; and PCI BIOS Specification, revision 2.1. These PCI specifications are available from the PCI Special Interest Group, P.O. Box 14070, Portland, Oreg. 97214.

A computer system has a plurality of information (data and address) buses such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor of the computer system communicates with main memory and with the peripherals that make up the computer system over these various buses. The microprocessor communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. A representative example of one of these new microprocessors is the PENTIUM PRO™ (a registered trademark of Intel Corporation) or P6.

The PENTIUM PRO processor implements a dynamic execution micro-architecture comprising a combination of multiple branch prediction, data flow analysis and speculative execution. A second level cache, advanced programmable interrupt controller, and memory bus controller are integrated into a dual cavity integrated circuit package. Another feature of the PENTIUM PRO processor is built-in direct multi-processing support. This enables up to four PENTIUM PRO processors to be connected in a multi-processor configuration without requiring additional "glue logic" components. In a multi-processor system, bus bandwidths are maximized by including pipelined transactions in which the bus transactions in different bus cycle phases overlap, and some of the transactions may be deferred for later completion. Bus transactions may both overlap and be taken out of order to execute, thus resulting in reduced latency in overall program execution.

A problem exists, however, if a memory or input-output ("I/O") cycle is pipelined after a PCI configuration cycle that changes the memory or I/O mapping, respectively, when the pipelined memory or I/O cycle is decoded and acted upon before the PCI configuration cycle has been completed. The PCI specification allows dynamic configuration of PCI devices which may change the computer system and I/O memory map.

Another example is when a notebook computer is hot-docked to an expansion base, the computer system must run auto-configuration cycles to configure the computer system to include the expansion base components. Thus, any I/O cycles must be held in abeyance until the I/O configuration cycle is complete. Otherwise, I/O devices may be addressed that do not yet exist (until configured), or in case of I/O functions duplicated in the notebook computer and the expansion base, the cycle might be directed to the wrong device (i.e., notebook, when it should be to the expansion base).

What is needed is a way for a multi-processor computer system, with processors which pipeline bus cycles, to assure that memory and/or I/O cycles will run only after a peripheral device configuration cycle has been completed.

OBJECTS OF THE INVENTION

It is therefore an object of the present invention to assure that memory and/or I/O cycles will run after a peripheral device configuration cycle which changes memory and/or I/O mapping.

It is a further object of the present invention to snoop stall the configuration cycle on the processor bus until the peripheral device configuration is completed.

It is a further object to stall the bus so that only one additional cycle can be pipelined onto the bus, before the configuration data cycle has completed.

It is a further object to inhibit the address decode for pipelined cycles until the PCI configuration cycle finishes on the bus.

It is a further object of the present invention to generate a signal within the address decode logic so as to prevent the address decode from taking place if a configuration cycle is running on the processor bus.

SUMMARY OF THE INVENTION

The above and other objects of the present invention are satisfied, at least in part, by stalling the decode of any memory or I/O cycle pending, and preventing further additional cycles on the computer system bus until the configuration data cycle has been completed. As soon as a configuration cycle moves from the request phase to the error phase, a processor can pipeline another memory or I/O cycle behind the configuration cycle. When using the Intel Corporation PENTIUM PRO (P6) microcomputer in a multi-processor configuration, there is no way to decode the configuration cycle in time to hold the multi-processor P6 computer system in the request phase, thereby preventing the very next cycle from being pipelined before the configuration cycle has completed. The P6 bus when connected to multiple processors can handle up to eight outstanding transactions.

A PCI configuration cycle consists of two I/O cycles. The first cycle is a double word ("DWORD") written to an I/O register having an I/O address of 0CF8h, and is hereinafter referred to as the "CONFIG_ADDR register." The second cycle may be a BYTE, WORD or DWORD written to an I/O register having an I/O address from 0CFCh to 0CFFh, and is hereinafter referred to as the "CONFIG_DATA register." During configuration of a PCI device, the first transaction on the P6 processor bus is addressing the CONFIG_ADDR register at 0CF8h and writing the desired configuration address thereto. The second transaction on the P6 bus is addressing the CONFIG_DATA register by selecting an address(es) from 0CFCh to 0CFFh and writing the desired configuration information thereto. A host to PCI bus bridge, and PCI to PCI bus bridges for purposes of this invention are considered and referred to as "PCI devices" or more generally "peripheral devices."

A P6 processor bus transaction may comprise up to six phases. The six phases of the PENTIUM PRO processor bus protocol are: 1) Arbitration, 2) Request, 3) Error, 4) Snoop, 5) Response, and 6) Data. Not all transactions contain all phases, and some phases may be overlapped with phases of another transaction. The P6 bus architecture supports pipelined transactions in which bus transactions in different phases overlap. Each PENTIUM PRO processor is capable of issuing up to four outstanding transactions. Transaction information is tracked in a queue called an "In-order Queue" ("IOQ").

According to the present invention, address decode control logic decodes a transaction occurring on the P6 processor bus and decides which destination interface will be sent the address and request information. When the address decode control logic detects a write to the CONFIG_DATA register of a PCI device (I/O addresses 0CFCh-0CFFh), it will assert an internal signal, "BlockDecode," that will prevent the address decode control logic from decoding any more incoming addresses from the P6 bus until the PCI interface indicates that writes to the CONFIG_DATA register have been completed. This avoids the situation where the multi-processor P6 computer system could pipeline a memory or I/O transaction after a write to the CONFIG_DATA register of the PCI device that may be changing the memory mapping or the destination of the I/O operation before the PCI device has completed its configuration. In this example, writing to the CONFIG_DATA register of the PCI device has to be completed or else the address decode logic may not be able to determine the proper destination interface for the incoming memory address or I/O cycle.

When a requesting agent does not own the bus, a transaction begins with the Arbitration Phase in which the requesting agent becomes the bus owner. Once the requesting agent becomes the bus owner, the transaction enters the Request Phase. In the Request Phase, the bus owner drives request and address information on the bus. The Request Phase is two clocks long. In the first clock, an address strobe signal, ADS#, is asserted along with the transaction address and sufficient information to begin snooping and memory access. The Error Phase occurs three clocks after the Request Phase begins. The Error Phase indicates any parity errors triggered by the request.

Every transaction that is not canceled because of an error during the Error Phase has a Snoop Phase, four or more clocks from the Request Phase. The snoop results of the Snoop Phase indicate if the address driven for a transaction references a valid or modified (dirty) cache line in any bus agent's cache. The snoop results also indicate whether a transaction will be completed in-order or may be deferred for possible out-of-order completion. After the Snoop Phase, there is a Response Phase which indicates whether the transaction has failed or succeeded, whether transaction completion is immediate or deferred, whether the transaction will be retried, and whether the transaction contains a Data Phase. If the transaction does not have a Data Phase, the transaction is complete after the Response Phase. The Data Phase is used by the Requesting Agent to transfer write data or to receive read data from the Addressed Agent, and may extend beyond the Response Phase. Not all transactions contain all phases, not all phases occur in order, and some phases can overlap.

The present invention utilizes the functional characteristics of certain P6 bus signals. These signals are the Bus Clock, BCLK; Address, A[35:3]#; Address Strobe, ADS#; Snoop Hit, HIT#; Hit-modified, HITM#; Response Status, RS[2:0]#; and Block Next Request, BNR#. A brief description of these signals are as follows:

A[35:3]# is the address in binary and is driven during the first BCLK of the Request Phase (the clock in which ADS# is asserted).

ADS# is asserted by the current bus owner for one clock to indicate a new Request Phase. If the request initiator continues to own the bus after the first Request Phase, it can issue a new request every three clocks.

BCLK is the PENTIUM PRO processor bus clock. All agents drive their outputs and latch their inputs on the BCLK rising edge.

BNR# blocks the next request signal in the arbitration group and is used to assert a bus stall by any bus agent who is unable to accept new bus transactions to avoid, for example, an internal transaction queue overflow. During a bus stall, the current bus owner cannot issue any new transactions.

HIT# and HITM# are used to indicate that a cache line is valid or invalid. If both HIT# and HITM# are asserted in the Snoop Phase, it means that an agent is not ready to indicate snoop status and requires that the Snoop Phase be stalled.

RS[2:0]# is driven by the response agent (the agent responsible for completion of the transaction at the top of the In-order Queue) and indicates the completion of the Response Phase for a transaction.

The aforementioned signals are utilized by the P6 processors and the computer system controller or "bus interface bridge" which connects the computer system random access memory ("RAM") and PCI buses to the P6 host bus. Up to four P6 processors may be connected to the P6 host bus, and the present invention contemplates from two to four P6 processors connected to the host bus. The bus interface bridge functions as a signal buffer and translator for the P6 host bus and the system RAM and PCI buses. The bus interface bridge comprises a processor interface, a PCI interface, a queue manager and a memory controller. The In-order Queue is also included in the bus interface bridge and it is part of the processor interface. Control and handshake signals between the PCI bus and host bus are translated in the bridge.

The present invention is used to solve the following problems: 1) If a memory cycle is pipelined after a PCI configuration cycle that changes the memory mapping, the memory cycle may be decoded before the configuration cycle has been completed and could attempt to address memory space not yet configured. 2) When a notebook computer is hot-docked to an expansion base, the notebook computer system must run configuration cycles in order to configure the new system (notebook and expansion base) before any cycles to devices that are being configured are executed. In a computer system using only a single P6 , the writes to I/O ports are guaranteed to be completed before the next instruction in the instruction stream is executed. Thus, I/O writes to control system hardware (for example, PCI devices) cause the hardware to be set to its new state before any other instructions are executed. This is not the case when two or more P6 processors are connected in a multiprocessor computer system.

When two or more P6 processors are connected to a host bus which is connected to the system controller, a situation exists that as soon as the configuration cycle moves from the Request Phase to the Error Phase one of the two or more P6 processors can pipeline another cycle behind the configuration cycle. Even if BNR# is asserted as soon as the cycle to the CONFIG_DATA register is decoded, there is no way to hold or slow down a P6 processor in the request phase so as to prevent the very next cycle from entering the request phase. This is because the BNR# cannot be driven fast enough to prevent one next cycle after the CONFIG_DATA cycle. Assertion of BNR#, however, will prevent subsequent cycles from occurring after the one next cycle following the CONFIG_DATA register decode.

Thus, even though a PCI configuration may execute as cycles 1 and 2, one of the two or more P6 processors may pipeline cycle 3 before a BNR# signal can be asserted and detected. Because of the pipelining features of the P6 computer system, a prematurely decoded and executed cycle 3 may occur before cycle 2 has finished configuring the response agent PCI device. If the cycle 3 transaction depends on that PCI device being configured, there could be computer system corruption.

The present invention elegantly solves the aforementioned undesirable decoding and routing of cycle 3 between the completion of PCI configuration cycles 1 and 2 by preventing the cycle 3 transaction address from being decoded in the bus interface bridge until the PCI device indicates that its configuration is finished. The present invention also asserts BNR# so that cycle 4 cannot occur until after the PCI device has been configured. The bus interface bridge address decoder is inhibited by a signal hereinafter called "BlockDecode" so that it does not decode the cycle 3 address driven on the P6 bus. The BlockDecode signal is asserted by the present invention whenever a configuration write to I/O address range from 0CFCh to 0CFFh is detected. The BlockDecode is deasserted only after there has been an acknowledgment from the PCI device that it has completed its configuration. Once BlockDecode is deasserted, the cycle 3 address may be decoded and sent to its proper destination in the computer system. HIT# and HITM# are both asserted to stall cycle 3 until its address has been decoded by the bus interface bridge address decoder. Once the PCI device configuration cycle 2 (CONFIG_DATA) completion is indicated, the cycle 3 address may be decoded to allow cycle 3 to proceed normally. BNR# and BlockDecode need not be asserted if cycle 2 is a PCI device CONFIG_DATA read instead of a write. In this case there is no reason to stall cycle 3.

A feature of the present invention is that the P6 bus is snoop stalled only during a configuration write, not during a configuration read which does not change any configuration or operating parameters in the PCI device. This is accomplished by snoop stalling and never posting I/O write cycles to the PCI configuration ports (0CF8h and 0CFCh). Other I/O write cycles are allowed to be posted.

Another feature of the present invention is that a signal is sent from the host processor bus address decode logic to prevent the address decode from taking place if a CONFIG_DATA write cycle is running on the processor bus. This is accomplished by asserting BlockDecode.

Yet another feature of the present invention is that if cycle 3 is pipelined on the P6 bus then the Snoop Phase control logic asserts HIT# and HITM# to stall cycle 3 until the configuration cycle has been completed.

Still another feature of the present invention is that is that BNR# is asserted to prevent cycle 4 from pipelining until the configuration cycle has been completed.

An advantage of the present invention is that software is not required to assure that the processors will be stalled until the PCI device configuration is completed.

Other and further objects, features and advantages will be apparent from the following description of presently preferred embodiments of the invention, given for the purpose of disclosure and taken in conjunction with the accompanying drawings.

DETAILED DESCRIPTION OF A PREFERRED EMBODIMENT

The present invention is a method and system for assuring the completion of a peripheral component interconnect (PCI) device configuration cycle before a memory cycle, or another I/O cycle can be decoded. The present invention recognizes a PCI configuration mechanism one occurring and inhibits further address decoding of subsequent memory or non-configuration I/O bus transactions. The address decoder/post control logic of the present invention observes the 32 bit configuration data (CONFIG_DATA) port occupying I/O addresses 0CFCh through 0CFFh and asserts an internal "BlockDecode" signal whenever there is a write data configuration. The BlockDecode inhibits further address decoding until completion of the PCI configuration cycle.

For illustrative purposes a preferred embodiment of the present invention is described hereinafter for computer systems utilizing the Intel P6 or PENTIUM PRO microprocessor architecture and certain terms and references will be specific to that processor platform. The Peripheral Component Interconnect ("PCI") bus is an interface standard, however, that is hardware independent and may be utilized with any host computer designed for this PCI interface standard. It will be appreciated by those skilled in the art of computer systems that the present invention may be adapted and applied to any multi-processor computer platform utilizing the PCI interface standard.

Figure 1:
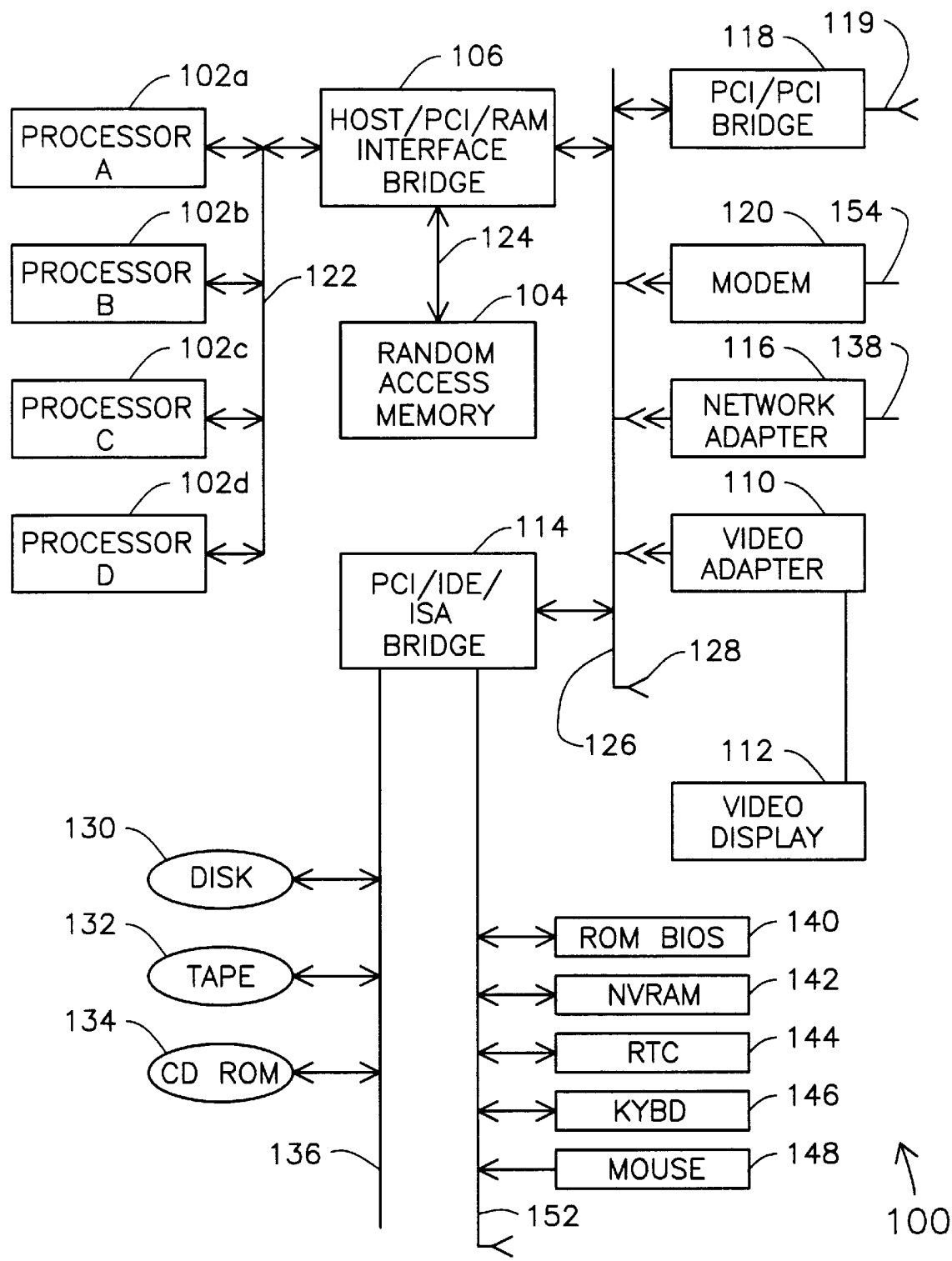
FIG. 1 is a schematic block diagram of a computer system.

Referring to the drawings, the details of a preferred embodiment of the present invention are schematically illustrated. Like elements in the drawings will be represented by like numbers, and similar elements will be represented by like numbers with a different lower case letter suffix. Referring now to FIG. 1, a schematic block diagram of a computer system utilizing the present invention is illustrated. A computer system, according to the present invention, is generally indicated by the numeral 100. The computer system 100 comprises processors 102a–102d, a random access memory (RAM) 104, a host/PCI/RAM bridge 106, a video graphic adapter 110, a video display 112, a PCI/IDE/ISA bridge 114, a local area network adapter 116, and a modem 120. The processors 102a–102d are connected to the host/PCI/RAM bridge 106 through a host bus 122. The RAM 104 is connected to the host/PCI/RAM bridge 106 through a memory bus 124.

A PCI bus 126 connects the host/PCI/RAM bridge 106 to the PCI/IDE/ISA bridge 114, local area network adapter 116, modem 120, video adapter 110, and a PCI/PCI bridge 118, collectively referred to hereinafter as "PCI devices" or more generally "peripheral devices." A host to PCI bus bridge, and PCI to PCI bus bridges for purposes of this invention are also considered and referred to as "PCI devices." In addition there are PCI board slots 128 for additional PCI device boards (not illustrated) and a second PCI bus 119 for additional PCI devices. Disk 130, tape drive 132 and CD-ROM drive 134 connect to the PCI/IDE/ISA bridge 114 through a IDE bus 136. The PCI local area network (LAN) adapter 116 connects to a local area network 138. The PCI/IDE/ISA bridge 114 also connects to a ROM BIOS 140, non-volatile random access memory (NVRAM) 142, real time clock (RTC) 144, system keyboard 146 and mouse 148 through an ISA bus 152. The PCI modem 120 connects to a telephone line 154.

Figure 2:
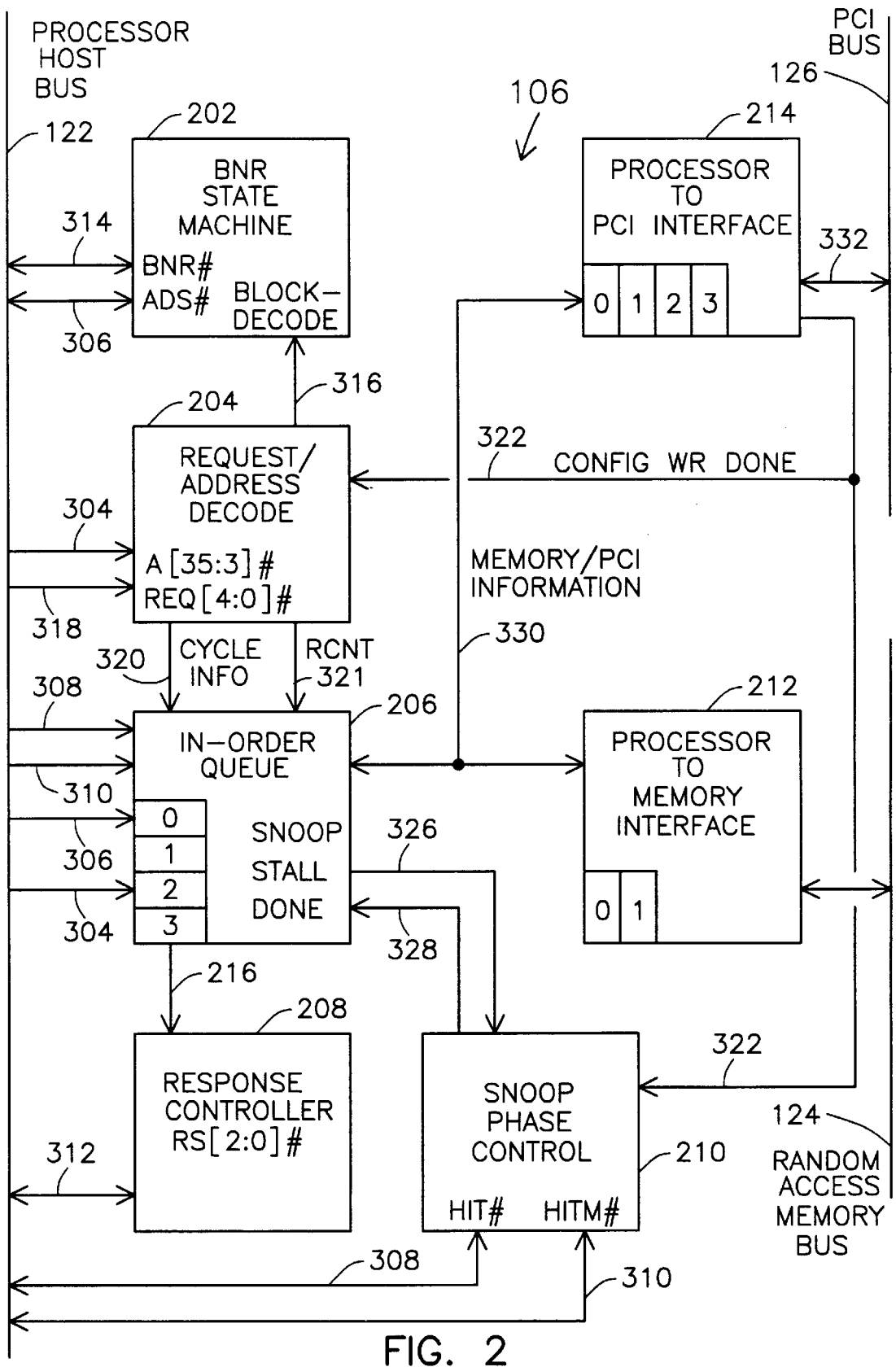
FIG. 2 is a schematic block diagram of an embodiment of the present invention according to the computer system of FIG. 1.

Referring now to FIG. 2, a more detailed schematic block diagram of the host/PCI/RAM interface bridge 106 of FIG. 1, according to the present invention, is illustrated. Some of the general functions, components and signal paths not dealing with the present invention are not described herein, but would be readily known to one of ordinary skill in the art of multi-processor P6 computer systems. The host/PCI/RAM interface bridge 106 adapts and interfaces address, data and control signals to and from the host bus 122 with appropriate address, data and control signals for RAM and PCI devices on the RAM bus 124 and the PCI bus 126, respectively.

The host/PCI/PAM interface bridge 106 comprises a BNR state machine 202, a request/address decode 204, an in-order queue 206, a response controller 208, a snoop phase control 210, a processor to memory interface 212, and a processor to PCI interface 214. The BNR state machine 202 is connected to host bus 122 signals BNR# 314 and ADS# 306. The request/address decode 204 is connected to host bus 122 signals A[35:3]# 304 and REQ[4:0]# 318. The request/address decode 204 generates a BlockDecode 316 signal which is sent to the BNR state machine 202, and Cycle Info 320 and Rcnt 321 signals which are sent to the in-order queue 206. The Cycle Info 320 includes information for the address of a request, the type of request (read or write), whether the request is for memory or I/O, and whether the request is a configuration cycle. The Rcnt 321 supplies information about the request count. The BlockDecode 316 signal is asserted whenever a configuration write cycle to a PCI device is in progress, as more fully described hereinafter. The request/address decode 204 also receives a ConfigWrDone 322 signal from the processor to PCI interface 214. The ConfigWrDone 322 signal indicates when the configuration of a PCI device being written to is complete.

The in-order queue 206 (as utilized in the present invention) receives host bus 122 signals HIT# 308, HITM# 310, ADS# 306 and A[35:3]# 304. The in-order queue 206 sends a snoop stall 326 signal to the snoop phase control 210 and receives a snoop phase done 328 signal from the snoop phase control 210. The in-order queue 206 is used to enable the pipelining of cycles from the processors 102 (FIG. 1) to the target or addressed destination, i.e., RAM or PCI device on the RAM bus 124 or PCI bus 126, respectively. The target information 330 from the in-order queue 206 is sent either to the processor to PCI interface 214 or processor to memory interface 212, depending on whether the target is a PCI device or RAM 104 (FIG. 1), respectively. The response controller 208 receives cycle information 216 from the in-order queue 206, and is also connected to the RS[2:0]# 312 signals of the host bus 122. The snoop phase control 210 receives the host bus 122 HIT# 308 and HITM# 310 signals.

The processor to PCI interface 214, according to the present invention, receives target information 330 from the in-order queue 206 for configuring a selected PCI device as well as cycle information for non-configuration cycles. The processor to PCI interface 214, formats the received target information 330 into standard PCI signals 332 which it applies to the PCI bus 126.

According to the present invention, the request/address decode 204 decodes a transaction occurring on the host bus 122 and decides which destination interface will be sent the address and data information (RAM bus 124 or PCI bus 126). When the request/address decode 204 detects a write to a configuration data (CONFIG_DATA) register of any PCI device occurring at any I/0 addresses between 0CFCh-0CFFh, it will assert the BlockDecode 316 signal to the BNR state machine 202. When the BlockDecode 316 signal is asserted it will prevent the address decode logic in the request/address decode 204 from decoding any more incoming addresses from the host bus 122 until the PCI device on the PCI bus 124 indicates that writes to its configuration register (not illustrated) have been completed (ConfigWrDone 322 signal). The BlockDecode 316 also signals the BNR state machine 202 to assert BNR# 314 to prevent any additional cycles from being pipelined on the host bus 122. This avoids the situation where the multi-processor P6 computer system could pipeline a memory or I/O transaction after a data write to a configuration register of a PCI device that may be used in determining a memory map or an I/O operation, but before the PCI device has completed its configuration cycle. In this example, writing to the configuration data registers of the PCI device have to be completed before another device may be addressed in the next pipelined cycle. Otherwise, the device being addressed in the next pipelined cycle may not be able to get the correct system operating information from the PCI device if the data registers of that PCI device are still being configured.

A PCI configuration cycle consists of two I/O cycles. The first cycle is a double word ("DWORD") written to an I/O register having an I/O address of 0CF8h, and is hereinafter referred to as the "CONFIG_ADDR register." The second cycle may be a BYTE, WORD or DWORD written to an I/O register having an I/O address from 0CFCh to 0CFFh, and is hereinafter referred to as the "CONFIG_DATA register." During configuration of any PCI device, the first transaction on the host bus 122 is addressing the CONFIG_ADDR register at 0CF8h and writing the desired configuration address thereto. The second transaction on the host bus 122 is addressing the CONFIG_DATA register by selecting an address(es) from 0CFCh to 0CFFh and writing the desired configuration information thereto.

Figure 3:
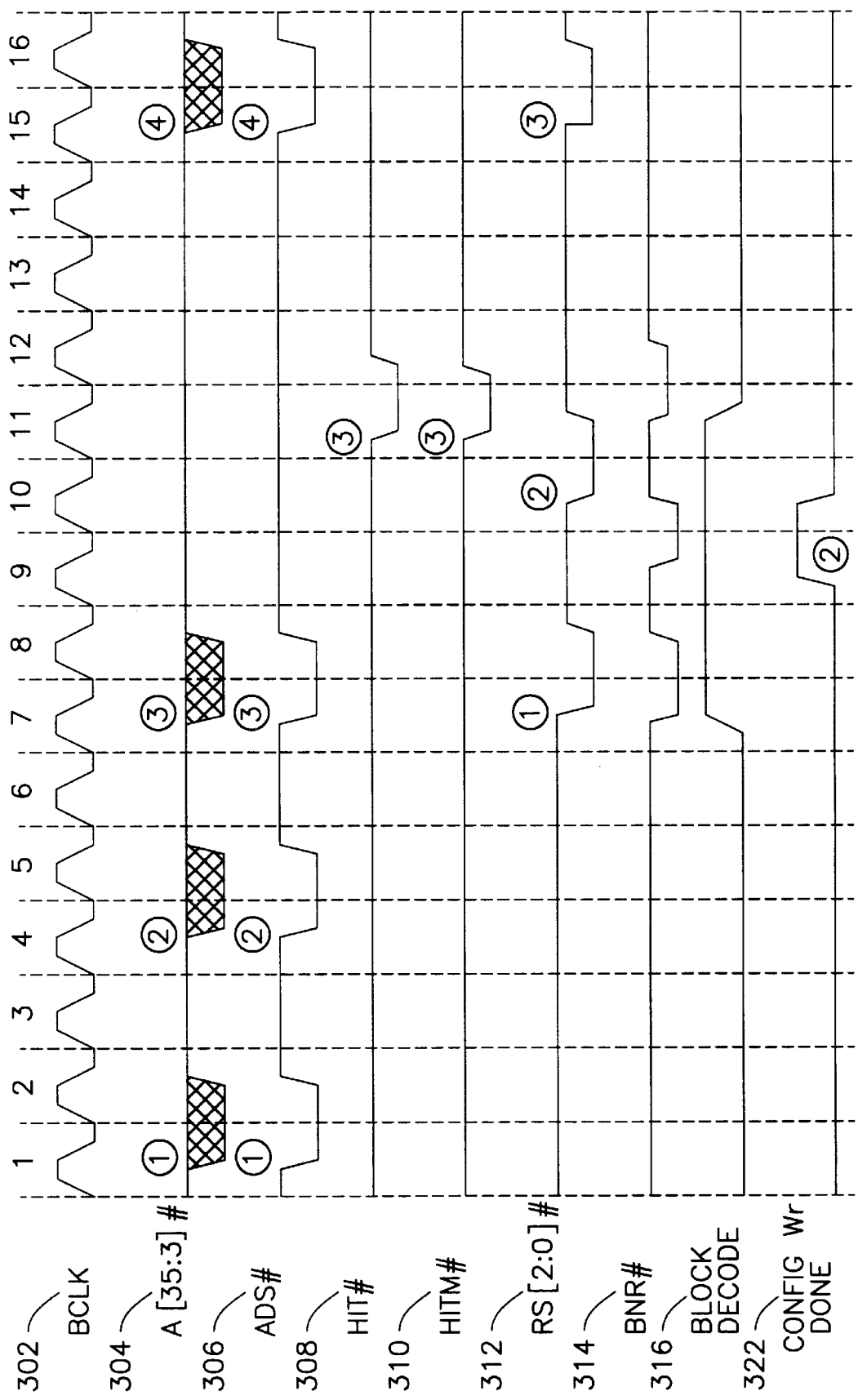
FIG. 3 is a schematic timing diagram of signals utilized in the present invention.

Referring now to FIG. 3, a schematic timing diagram of signals on the host bus 122 according to the present invention is illustrated. The timing diagram of FIG. 3 comprises the following signals: Bus Clock, BCLK 302; Address, A[35:3]# 304; Address Strobe, ADS# 306; Snoop Hit, HIT# 308; Hit-modified, HITM# 310; Response Status, RS[2:0]# 312; Block Next Request, BNR# 312; and BlockDecode 316 and ConfigWrDone 322 which are internally generated signals in the host/PCI/RAM interface bridge 106 (request/address decode 204 and processor to PCI interface 214, respectively, of FIG. 2). A brief description of these signals are as follows:

A[35:3]# 304 is the address in binary and is driven during the first BCLK of the Request Phase (the clock in which ADS# is asserted).

ADS# 306 is asserted by the current bus owner for one clock to indicate a new Request Phase. If the request initiator continues to own the bus after the first Request Phase, it can issue a new request every three clocks.

BCLK 302 is the PENTIUM PRO processor bus clock. All agents drive their outputs and latch their inputs on the BCLK rising edge.

BNR# 314 blocks the next request signal in the arbitration group and is used to assert a bus stall by any bus agent who is unable to accept new bus transactions to avoid, for example, an internal transaction queue overflow. During a bus stall, the current bus owner cannot issue any new transactions.

ConfigWrDone 322 indicates when the configuration of a PCI device being written to is complete.

HIT# 308 and HITM# 310 are used to indicate that a cache line is valid or invalid. If both HIT# 308 and HITM# 310 are asserted in the Snoop Phase, it means that an agent is not ready to indicate snoop status and requires that the Snoop Phase be stalled.

RS[2:0]# 312 is driven by the response agent (the agent responsible for completion of the transaction at the top of the In-order Queue 206) and indicates the completion of the Response Phase for a transaction.

BlockDecode 316 is asserted by the present invention whenever a write to the I/O address range of from 0CFCh to 0CFFh is detected in the request/address decoder 204 (FIG. 2).

The BlockDecode 316 is deasserted only after there has been an acknowledgment from the PCI device addressed that it has completed its configuration cycle via the ConfigWrDone 322 signal (FIG. 2). The ConfigWrDone 322 signal is also used to generate the RS[2:0]# 312 signals for the I/O write to 0CFCh to 0CFFh. Once BlockDecode 316 is deasserted, the next cycle address may be decoded and sent to its proper destination in the computer system. In the present invention, BlockDecode 316 is deasserted one clock, BCLK 302, after the response for the configuration cycle is driven on the RS[2:0]# 312 signal lines. The deassertion of BlockDecode 316 also signals the BNR state machine 202 to transition the P6 processor host bus 122 out of the Request Stall Stalled State as more fully defined in the Intel PENTIUM PRO specification.

A P6 processor host bus 122 transaction may comprise up to six phases. The six phases of the PENTIUM PRO processor bus protocol are: 1) Arbitration, 2) Request, 3) Error, 4) Snoop, 5) Response, and 6) Data. Not all transactions contain all phases, and some phases may be overlapped with phases of another transaction. The P6 bus architecture supports pipelined transactions in which bus transactions in different phases overlap. Each PENTIUM PRO processor is capable of issuing up to four outstanding transactions. Transaction information is tracked in a queue called an "In-order Queue" (in-order queue 206 of FIG. 2).

When a requesting agent does not own the bus, a transaction begins with the Arbitration Phase in which the requesting agent becomes the bus owner. Once the requesting agent becomes the bus owner, the transaction enters the Request Phase. In the Request Phase, the bus owner drives request and address information on the bus. The Request Phase is two clocks long. In the first clock, the address strobe signal, ADS# 306, is asserted along with the transaction address A[35:3]# 304 and sufficient information to begin snooping and memory access. The Error Phase occurs three clocks after the Request Phase begins. The Error Phase indicates any parity errors triggered by the request.

Every transaction that is not canceled because of an error during the Error Phase has a Snoop Phase, four or more clocks from the Request Phase. The snoop results of the Snoop Phase indicate if the address driven for a transaction references a valid or modified (dirty) cache line in any bus agent's cache. The snoop results also indicate whether a transaction will be completed in-order or may be deferred for possible out-of-order completion. After the Snoop Phase, there is a Response Phase which indicates whether the transaction has failed or succeeded, whether transaction completion is immediate or deferred, whether the transaction will be retried, and whether the transaction contains a Data Phase. If the transaction does not have a Data Phase, the transaction is complete after the Response Phase. The Data Phase is used by the Requesting Agent to transfer write data or to receive read data from the Addressed Agent, and may extend beyond the Response Phase. Not all transactions contain all phases, not all phases occur in order, and some phases can overlap.

When two or more P6 processors 102 are connected to the host bus 122 which is connected to the host/PCI/RAM interface bridge 106 (system controller), a situation exists that as soon as the configuration cycle moves from the Request Phase to the Error Phase one of the two or more P6 processors 102 can pipeline another cycle behind the configuration cycle. The P6 processors 102 cannot be held in the request phase since there is not enough time to decode the configuration cycle and assert BNR# 314 before a cycle 3 may enter the request phase from another one of the P6 processors 102. Thus, even though a PCI configuration may execute as cycles 1 and 2, one of the two or more P6 processors 102 may pipeline cycle 3 before the BNR# 314 signal can be asserted and detected by the processors 102 on the host bus 122. Because of the pipelining features of the P6 computer system, a premature decode of cycle 3 may occur before cycle 2 has finished configuring the data registers of the addressed response agent PCI device. If the cycle 3 transaction depends on information stored in the data registers of the PCI device being configured, there could be a computer system corruption which might result in a system crash.

As illustrated in FIG. 3, the PCI configuration begins at cycle 1, illustrated herein as the numeral 1 in a circle. Likewise cycles 2, 3 and 4 are illustrated as their respective numerals in circles. In cycle 1, the CONFIG_ADDR register is written to at I/O address 0CF8h. In cycle 2, the CONFIG_DATA register is written to at selected I/O address(es) from 0CFCh to 0CFFh. As soon as an I/O address in the range from 0CFCh to 0CFFh and a write transaction is detected by the request/address decoder 204 (FIG. 2), the BlockDecode 316 is asserted and the BNR state machine 202 asserts BNR# 314 on the host bus 122 so as to prevent any of the P6 processors 102 from pipelining additional cycles after cycle 3, i.e., cycles 4, 5, etc. In the logic of the request/address decode 204, the BlockDecode 316 signal prevents any further address decoding (e.g., cycle 3) from taking place until the PCI device configuration cycle 2 has completed as indicated by the ConfigWrDone 322 signal from the PCI interface 214.

As illustrated in the timing diagram of FIG. 3, a processor 102 has pipelined cycle 3 before it could detect the asserted BNR# 314 signal. The present invention, however, solves this undesirable pipelining of cycle 3 by not decoding the cycle 3 address until the configuration cycle 2 is complete, as indicated by the ConfigWrDone 322 signal from the PCI interface 214. The cycle 3 address is not decoded until the BlockDecode 316 is deasserted at the rising edge of the eleventh ($11^{th}$) BCLK 302. HIT# 308 and HITM# 310 are also both asserted to stall cycle 3 until the cycle 3 address is decoded in the request/address decode 204. Cycle 3 may then be allowed to proceed normally.

The present invention thus elegantly solves the aforementioned undesirable pipelining of cycle 3 before the completion of PCI data configuration cycle 2 by preventing the cycle 3 transaction address from being decoded in the request/address decode 204 until the PCI device data configuration has completed. The present invention also asserts BNR# 314 so that cycle 4 cannot occur until after completion of the PCI device configuration cycle. The request/address decode 204 is inhibited by the BlockDecode 316 so that it does not decode the cycle 3 address asserted on the P6 host bus 122. The BlockDecode 316 is asserted by the present invention whenever a configuration data write to I/O address(es) from 0CFCh to 0CFFh is detected. The BlockDecode 316 is deasserted only after the cycle has been completed on the PCI bus and a response signal, RS[2:0]# 312, has been sent to the processor 102 via the host bus 122. Once BlockDecode 316 is deasserted, the cycle 3 address may be decoded and the cycle 3 sent to its proper destination in the computer system. HIT# 308 and HITM# 310 are both asserted to stall cycle 3 until its address has been decoded by the request/address decode 204. Once the PCI device configuration cycles 1 and 2 are completed and the cycle 3 address has been decoded, cycle 3 is allowed to proceed normally. BNR# 314 and BlockDecode 316 need not be asserted if cycle 2 is a configuration read instead of a write. In this case there is no reason to stall the decode of cycle 3.

The present invention, therefore, is well adapted to carry out the objects and attain the ends and advantages mentioned, as well as others inherent therein. While the present invention has been depicted, described, and is defined by reference to a particularly preferred embodiment of the invention, such reference does not imply a limitation on the invention, and no such limitation is to be inferred. The invention is capable of considerable modification, alternation, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A multi-processor computer system wherein a configuration cycle for a peripheral device is completed before other transactions are executed, said system comprising:

a plurality of microprocessors connected to a host bus;

interface logic connecting the host bus to a peripheral bus and a random access memory bus;

a peripheral device connected to the peripheral bus;

a random access memory connected to the random access memory bus;

address decode logic in the interface logic, the address decode logic decoding addresses of transactions from the plurality of microprocessors connected to the host bus, wherein the transactions are sent to the peripheral device connected to the peripheral bus or the random access memory connected to the random access memory bus based upon the decoded addresses of the transactions;

logic for detecting a configuration data register write address from the decoded addresses of the transactions; and logic for inhibiting the address decode logic from decoding the addresses of the transactions, the address decode logic being inhibited when the configuration data register write address is detected and remains inhibited until a configuration data register write transaction to the peripheral device is finished.

2. The multi-processor computer system of claim 1, wherein the peripheral device is a peripheral component interconnect (PCI) device.

3. The multi-processor computer system of claim 1, wherein the configuration data register write address is selected from the group consisting of input-output (I/O) addresses from 0CFCh to 0CFFh.

4. The multi-processor computer system of claim 1, further comprising:

logic for asserting a halt signal on the host bus for halting further transactions on the host bus, the halt signal being asserted when the configuration data register write address is detected and being deasserted when the configuration data register write transaction to the peripheral device is finished.

5. The multi-processor computer system of claim 1, further comprising:

logic for asserting a stall signal on the host bus for stalling a current transaction on the host bus, the stall signal being asserted when the configuration data register write address is detected and being deasserted when the configuration data register write transaction to the peripheral device is finished.

6. The multi-processor computer system of claim 1, wherein the computer system is a portable computer adapted for connection to a docking station.

7. The multi-processor computer system of claim 1, further comprising a plurality of peripheral devices connected to the peripheral bus.

8. The multi-processor computer system of claim 1, wherein the peripheral device is a host bus to peripheral bus bridge.

9. A multi-processor computer system wherein a configuration cycle for a peripheral component interconnect (PCI) device is completed before other transactions are executed, said system comprising:

a plurality of microprocessors connected to a host bus;

interface logic connecting the host bus to a peripheral component interconnect (PCI) bus and a random access memory bus;

a peripheral component interconnect (PCI) device connected to the PCI bus;

a random access memory connected to the random access memory bus;

address decode logic in the interface logic, the address decode logic decoding addresses of transactions from the plurality of microprocessors connected to the host bus, wherein the transactions are sent to the PCI device connected to the PCI bus or the random access memory connected to the random access memory bus based upon the decoded addresses of the transactions;

logic for detecting a configuration data register write address from the decoded addresses of the transactions;

logic for inhibiting the address decode logic from decoding the addresses of the transactions, the address decode logic being inhibited when the configuration data register write address is detected and remains inhibited until a configuration data register write transaction to the PCI device is finished;

logic for asserting a block next request (BNR#) signal on the host bus for halting further transactions on the host bus, the BNR# signal being asserted when the configuration data register write address is detected and being deasserted when the configuration data register write transaction to the PCI device is finished; and logic for stalling a current transaction by asserting snoop-hit (HIT#) and hit-modified (HITM#) signals during a snoop phase on the host bus, the HIT# and HITM# signals being asserted when the configuration data register write address is detected and being deasserted when the configuration data register write transaction to the PCI device is finished.

10. The multi-processor computer system of claim 9, wherein the configuration data register write address consists of input-output (I/O) addresses from 0CFCh to 0CFFh.

11. The multi-processor computer system of claim 9, wherein the computer system is a portable computer adapted for connection to a docking station.

12. The multi-processor computer system of claim 9, further comprising a plurality of PCI devices connected to the PCI bus.

13. The multi-processor computer system of claim 9, wherein the PCI device is a host bus to PCI bus bridge.

14. The multi-processor computer system of claim 9, wherein the PCI device is a PCI bus to PCI bus bridge.

15. A method, in a multi-processor computer system, of configuring a peripheral device before other transactions are executed, said method comprising the steps of:

monitoring transactions on a host bus from a plurality of microprocessors connected to the host bus by interface logic connected to the host bus, the interface logic also connected to a peripheral bus having a peripheral device connected thereto;

decoding addresses of the transactions for determining when some of the transactions are for the peripheral device;

detecting from the decoded addresses of the transactions a configuration data register write address for the peripheral device; and inhibiting address decode logic of the interface logic from decoding the addresses of the transactions, the address decode logic being inhibited when the configuration data register write address is detected and remains inhibited until a configuration data register write transaction to the peripheral device is finished.

16. The method of claim 15, wherein the peripheral device is a peripheral component interconnect (PCI) device.

17. The method of claim 15, wherein the configuration data register write address is selected from the group consisting of input-output (I/O) addresses from 0CFCh to 0CFFh.

18. The method of claim 15, further comprising the step of:

asserting a halt signal on the host bus for halting further transactions on the host bus, the halt signal being asserted when the configuration data register write address is detected and being deasserted when the configuration data register write transaction to the peripheral device is finished.

19. The method of claim 15, further comprising the step of:

asserting a stall signal on the host bus for stalling a current transaction on the host bus, the stall signal being asserted when the configuration data register write address is detected and being deasserted when the configuration data register write transaction to the peripheral device is finished.

20. A method, in a multi-processor computer system, of configuring a peripheral component interconnect (PCI) device before other transactions are executed, said method comprising the steps of:

monitoring transactions on a host bus from a plurality of microprocessors connected to the host bus by interface logic connected to the host bus, the interface logic also connected to a peripheral component interconnect (PCI) bus having a PCI device connected thereto;

decoding addresses of the transactions for determining when some of the transactions are for the PCI device;

detecting from the decoded addresses of the transactions a configuration data register write address for the PCI device;

inhibiting address decode logic of the interface logic from decoding the addresses of the transactions, the address decode logic being inhibited when the configuration data register write address is detected and remains inhibited until a configuration data register write transaction to the PCI device is finished;

asserting a block next request (BNR#) signal on the host bus for halting further transactions on the host bus, the BNR# signal being asserted when the configuration data register write address is detected and being deasserted when the configuration data register write transaction to the PCI device is finished; and asserting snoop-hit (HIT#) and hit-modified (HITM#) signals during a snoop phase on the host bus for stalling a current transaction on the host bus, the HIT# and HITM# signals being asserted when the configuration data register write address is detected and being deasserted when the configuration data register write transaction to the PCI device is finished.

21. The multi-processor computer system of claim 20, wherein the configuration data register write address is selected from the group consisting of input-output (I/O) addresses from 0CFCh to 0CFFh.

22. A method of configuring a peripheral component interconnect (PCI) device before other transactions are executed in a multi-processor computer system, said method comprising the steps of:

writing to a configuration data register via a write transaction on a host bus for a peripheral component interconnect (PCI) device;

inhibiting address decoding of transactions on the host bus, the address decoding being inhibited when a configuration data register write input-output (I/O) address from 0CFCh to 0CFFh is detected and remains inhibited until the configuration data register write transaction to the PCI device is finished;

asserting a block next request (BNR#) signal on the host bus for halting further transactions on the host bus, the BNR# signal being asserted when the configuration data register write address is detected and being deasserted when the configuration data register write transaction to the PCI device is finished; and asserting snoop-hit (HIT#) and hit-modified (HITM#) signals during a snoop phase on the host bus for stalling a current transaction on the host bus, the HIT# and HITM# signals being asserted when the configuration data register write address is detected and being deasserted when the configuration data register write transaction to the PCI device is finished.

* * * * *